United States Patent
Pan et al.

(10) Patent No.: US 9,794,945 B2
(45) Date of Patent: Oct. 17, 2017

(54) METHOD, SYSTEM, AND DEVICE FOR CONFIRMING UPLINK-DOWNLINK CONFIGURATION

(75) Inventors: Xueming Pan, Beijing (CN); Shaohui Sun, Beijing (CN); Guojun Xiao, Beijing (CN); Fei Qin, Beijing (CN); Zukang Shen, Beijing (CN); Yu Ding, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 621 days.

(21) Appl. No.: 13/991,157

(22) PCT Filed: Nov. 25, 2011

(86) PCT No.: PCT/CN2011/082953
§ 371 (c)(1),
(2), (4) Date: Sep. 12, 2013

(87) PCT Pub. No.: WO2012/072005
PCT Pub. Date: Jun. 7, 2012

(65) Prior Publication Data
US 2013/0343217 A1    Dec. 26, 2013

(30) Foreign Application Priority Data
Dec. 2, 2010 (CN) .......................... 2010 1 0571151

(51) Int. Cl.
*H04W 72/08* (2009.01)
*H04L 1/00* (2006.01)
(Continued)

(52) U.S. Cl.
CPC ......... *H04W 72/082* (2013.01); *H04L 1/0026* (2013.01); *H04W 52/244* (2013.01);
(Continued)

(58) Field of Classification Search
None
See application file for complete search history.

(56) References Cited

U.S. PATENT DOCUMENTS 5,828,948 A * 10/1998 Almgren et al. ............. 455/450
5,884,145 A * 3/1999 Haartsen ...................... 455/63.2
(Continued)

FOREIGN PATENT DOCUMENTS

CN       1816198 A       8/2006
CN     101212797 A       7/2008
(Continued)

OTHER PUBLICATIONS

PCT International Search Report for PCT Counterpart Application No. PCT/CN2011/082953, 6 pgs., (Mar. 8, 2012).
(Continued)

*Primary Examiner* — Steven H Nguyen
(74) *Attorney, Agent, or Firm* — Blakely, Sokoloff, Taylor & Zafman LLP

(57) ABSTRACT

Provided are a method, a system, and a device for confirming an uplink-downlink configuration, for use in confirming via interference detection whether or not a cell is capable of conducting independently the uplink-downlink configuration. The method comprises: a network side device confirming the value of an interference parameter of a target cell (201); on the basis of the value of the interference parameter of the target cell, the network side device confirming whether or not the target cell is capable of conducting autonomously the uplink-downlink configuration (202). Employment of the present invention allows for the normal operation of a dynamic uplink-downlink configuration, reduced interference between adjacent cells in a dynamic uplink-downlink configuration environment, and improved system efficiency.

20 Claims, 3 Drawing Sheets

```
                           ┌─ 201
┌─────────────────────────────────────────────────────────┐
│ A network-side apparatus determines an interference    │
│ parameter value of a target cell                        │
└─────────────────────────────────────────────────────────┘
                              │
                              ▼  ┌─ 202
┌─────────────────────────────────────────────────────────┐
│ The network-side apparatus determines from the         │
│ interference parameter value of the target cell whether │
│ the target cell can select an uplink and downlink      │
│ configuration autonomously                              │
└─────────────────────────────────────────────────────────┘
```

(51) Int. Cl.
*H04W 24/00* (2009.01)
*H04W 24/02* (2009.01)
*H04W 28/18* (2009.01)
*H04L 5/14* (2006.01)
*H04W 52/24* (2009.01)
*H04W 52/40* (2009.01)
*H04B 17/327* (2015.01)
*H04W 72/04* (2009.01)

(52) U.S. Cl.
CPC .......... *H04B 17/327* (2015.01); *H04L 5/1469* (2013.01); *H04W 24/00* (2013.01); *H04W 24/02* (2013.01); *H04W 28/18* (2013.01); *H04W 52/242* (2013.01); *H04W 52/40* (2013.01); *H04W 72/0446* (2013.01)

(56) References Cited

U.S. PATENT DOCUMENTS

| | | | | |
|---|---|---|---|---|
| 5,898,928 | A * | 4/1999 | Karlsson et al. | 455/450 |
| 6,108,321 | A * | 8/2000 | Anderson et al. | 370/329 |
| 6,119,011 | A * | 9/2000 | Borst et al. | 455/452.2 |
| 6,930,993 | B1 * | 8/2005 | Hamada et al. | 370/347 |
| 6,977,912 | B1 * | 12/2005 | Porter et al. | 370/329 |
| 8,423,035 | B1 * | 4/2013 | Dinan | H04W 16/04 |
| | | | | 370/329 |
| 8,737,229 | B2 * | 5/2014 | Khandekar et al. | 370/237 |
| 8,891,489 | B2 * | 11/2014 | Attar et al. | 370/332 |
| 2005/0070285 | A1 * | 3/2005 | Goransson | 455/436 |
| 2006/0094433 | A1 * | 5/2006 | Cheng et al. | 455/439 |
| 2008/0192660 | A1 * | 8/2008 | Li | H04W 72/087 |
| | | | | 370/294 |
| 2009/0028112 | A1 * | 1/2009 | Attar et al. | 370/332 |
| 2009/0073902 | A1 * | 3/2009 | Astely | H04B 7/2656 |
| | | | | 370/280 |
| 2009/0135748 | A1 * | 5/2009 | Lindoff | H04W 72/048 |
| | | | | 370/296 |
| 2010/0062717 | A1 * | 3/2010 | Brisebois et al. | 455/63.1 |
| 2010/0255854 | A1 * | 10/2010 | Lee | H04W 72/082 |
| | | | | 455/450 |
| 2011/0228700 | A1 * | 9/2011 | Mildh | H04B 7/2606 |
| | | | | 370/254 |
| 2013/0136028 | A1 * | 5/2013 | Gan | H04W 24/02 |
| | | | | 370/252 |
| 2013/0136041 | A1 * | 5/2013 | Hoymann | H04W 24/02 |
| | | | | 370/280 |

FOREIGN PATENT DOCUMENTS

| | | | |
|---|---|---|---|
| CN | 102036295 A | 4/2011 | |
| CN | 102036296 A | 4/2011 | |
| WO | WO 9631989 A1 * | 10/1996 | H04Q 7/36 |
| WO | WO 2007112629 A1 * | 10/2007 | H04L 12/26 |
| WO | WO 2008008920 A2 * | 1/2008 | H04Q 7/38 |

OTHER PUBLICATIONS

PCT Written Opinion of the International Searching Authority for PCT Counterpart Application No. PCT/CN2011/082953, 23 pp. (including English translation), (Mar. 8, 2012).

PCT Notification Concerning Transmittal of International Preliminary Report on Patentability (Chapter I of the Patent Cooperation Treaty) for PCT Counterpart Application No. PCT/CN2011/082953, 26 pp. (including English translation), (Jun. 13, 2013).

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, 83 pp., (Dec. 2009).

\* cited by examiner

METHOD, SYSTEM, AND DEVICE FOR CONFIRMING UPLINK-DOWNLINK CONFIGURATION

CROSS-REFERENCE TO RELATED APPLICATIONS

This patent application is a U.S. National Stage under 35 U.S.C. §371 of International Application No. PCT/CN2011/082953, filed on Nov. 25, 2011, entitled METHOD, SYSTEM, AND DEVICE FOR CONFIRMING UPLINK-DOWNLINK CONFIGURATION, designating the United States, and claiming the benefit of Chinese Patent Application No.: 201010571151.4, filed with the Chinese Patent Office on Dec. 2, 2010 and entitled "Method, System and Apparatus for Determining Uplink and Downlink Configuration", which is hereby incorporated by reference in its entirety.

FIELD

The present invention relates to the field of wireless communications and particularly to a method, system and apparatus for determining an uplink and downlink configuration.

BACKGROUND

With regarding to general duplex modes adopted in a cellular system, a Time Division Duplex (TDD) mode refers to transmission of uplink and downlink signals in the uplink and downlink with the same operating frequency band in different periods of time, where there is a Guard Period (GP) between the uplink and downlink; and a Frequency Division Duplex (FDD) mode refers to possible transmission of uplink and downlink signals in the uplink and downlink with different operating frequency bands at the same time over different frequency carriers, where there is a Guard Band (GB) between the uplink and downlink.

A frame structure of a Long Term Evolution (LTE) TDD system is somewhat complicated, and as illustrated in FIG. 1, a radio frame with a length of 10 ms includes 10 sub-frames in total including special sub-frame(s) and normal sub-frames, and each sub-frame is of 1 ms. The special sub-frame includes three time slots, a Downlink Pilot Time Slot (DwPTS) for transmitting a Primary Synchronized Signal (PSS), a Physical Downlink Control Channel (PDCCH), a Physical HARQ Indication Channel (PHICH), a Physical Control Format Indication Channel (PCFICH), a Physical Downlink Shared Channel (PDSCH), etc.; a GP for a guard period between the downlink and uplink; and an Uplink Pilot Time Slot (UpPTS) for transmitting a Sounding Reference Signal (SRS), a Physical Random Access Channel (PRACH), etc. The normal sub-frames include uplink sub-frames and downlink sub-frames for transmitting uplink/downlink control signaling, service data, etc. Particularly in one radio frame, two special sub-frames may be configured in sub-frames 1 and 6 respectively or one special sub-frame may be configured in the sub-frame 1. Sub-frame 0 and sub-frame 5, and the DwPTS sub frame in the special sub-frame(s) are always used for downlink transmission, Sub-frame 2 and the UpPTS in the special sub-frame(s) are always used for uplink transmission, and the remaining sub-frames can be configured as needed for uplink transmission or downlink transmission.

In a TDD system, the same frequency resource is used for uplink and downlink transmission, and uplink and downlink signals are transmitted in different time slots. In a common TDD system including 3G Time Division Synchronized Code Division Multiple Access (TD-SCDMA) system and a 4G TD-LTE system, uplink and downlink sub-frames are allocated statically or semi-statically, and a common practice is to determine and maintain a proportional allocation of uplink and downlink sub-frames dependent upon a cell type and a rough service proportion in the course of planning a network. This is a simple and effective practice in a context with large coverage of a macro cell. Along with the development of technologies, an increasing number of low-power base stations including home NodeBs and so on in a pico cell have been deployed for provision of small local coverage, and there are a small number of users with a significantly varying service demand in this kind of cell, thus there exists a scenario with a dynamically varying demand for an uplink and downlink service proportion in the cell.

In order to accommodate such a dynamically varying demand for a service proportion, some researchers come to consider optimization of the TDD system by introducing a more dynamic uplink and downlink configuration solution with the aim of accommodating a varying service proportion and improving the efficiency of the system. For example in a TDD network, a macro cell is configured with a relatively symmetric uplink and downlink proportion (DL:UL=3:2), and a part of femto cells are configured with a downlink-dominant proportion (DL:UL=4:1) in view of a predominating user demand for download, while another part of femto cells are configured with a uplink-dominant proportion (DL:UL=2:3) in view of a predominating user demand for upload.

If adjacent cells are configured with different uplink and downlink proportions, then there may be interference across time slots. In FIG. 2, a macro cell transmits a downlink signal in a time slot in which a femto cell receives an uplink signal, then between the two cells:

Inter-NodeB interference may arise in that direct reception of the downlink signal of a macro NodeB by a femto NodeB will influence seriously the quality of the uplink signal of a Local UE (L-UE) received by the femto NodeB.

The foregoing interference may influence seriously the performance of the entire network, but there is no solution in the prior art to such an interference problem.

SUMMARY

Embodiments of the invention provide a method, system and apparatus for determining an uplink and downlink configuration so as to detect interference to thereby determine whether a cell can select an uplink and downlink configuration independently.

An embodiment of the invention provides a method of determining an uplink and downlink configuration, the method includes:

a network-side apparatus determining an interference parameter value of a target cell; and the network-side apparatus determining from the interference parameter value of the target cell whether the target cell can select an uplink and downlink configuration autonomously.

An embodiment of the invention provides an apparatus for determining an uplink and downlink configuration, the apparatus includes:

a first parameter value determination module configured to determine an interference parameter value of a target cell; and a first configuration determination module configured to determine from the interference parameter value of the target cell whether the target cell can select an uplink and downlink configuration autonomously.

An embodiment of the invention provides a NodeB including:

a process module configured to determine an interference parameter value, wherein the interference parameter value is configured to instruct a network-side apparatus to determine whether a current cell can select an uplink and downlink configuration autonomously; and a report module configured to report the determined interference parameter value.

An embodiment of the invention provides a system for determining an uplink and downlink configuration, the system includes a NodeB, and the system further includes:

a network-side apparatus configured to determine an interference parameter value of a target cell and to determine from the interference parameter value of the target cell whether the target cell can select an uplink and downlink configuration autonomously.

An embodiment of the invention provides another method of determining an uplink and downlink configuration, the method includes:

a NodeB determining an interference parameter value of a current cell; and the NodeB determining from the interference parameter value of the current cell whether the current cell can select an uplink and downlink configuration autonomously.

An embodiment of the invention provides another apparatus for determining an uplink and downlink configuration, the apparatus includes:

a second parameter value determination module configured to determine an interference parameter value of a current cell; and a second configuration determination module configured to determine from the interference parameter value of the current cell whether the current cell can select an uplink and downlink configuration autonomously.

Since it is determined from an interference parameter value of a cell whether the cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

DETAILED DESCRIPTION OF THE EMBODIMENTS

In embodiments of the invention, a network-side apparatus determines from an interference parameter value of a target cell whether the target cell can select an uplink and downlink configuration autonomously; or a NodeB determines from an interference parameter value of a current cell whether the current cell can select an uplink and downlink configuration autonomously. Since it is determined from an interference parameter value of a cell whether the cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

Particularly the embodiments of the invention can be applicable to a TDD system (e.g., a TD-LTE system) and also to a system in which it is necessary to adjust an uplink and downlink configuration of sub-frames dynamically, e.g., a TD-SCDMA system and latter evolved systems thereof, a Worldwide Interoperability for Microwave Access (Wi-MAX) system and latter evolved system thereof, etc.

The following description will be given firstly of an implementation with cooperation of the network side and the UE side and lastly of implementations respectively at the network side and the UE side, but this will not mean required cooperation of the network side and the UE side for an implementation, and in fact, problems present at the network side and the UE side can also be addressed in the separate implementations at the network side and the UE side although a better technical effect can be achieved with their cooperation in use.

The embodiments of the invention will be further detailed below with reference to the drawings.

Figure 3:
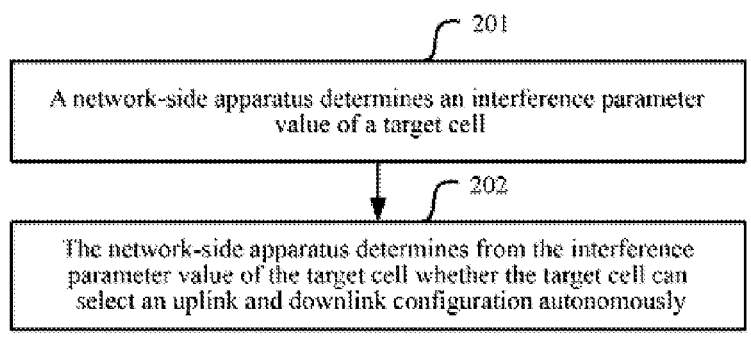
FIG. 3 is a schematic flow chart of a method of centralized determination of an uplink and downlink configuration according to an embodiment of the invention.

As illustrated in FIG. 3, a method of centralized determination of an uplink and downlink configuration according to an embodiment of the invention includes the following steps:

Step 201. A network-side apparatus determines an interference parameter value of a target cell.

Step 202. The network-side apparatus determines from the interference parameter value of the target cell whether the target cell can select an uplink and downlink configuration autonomously.

In the embodiment of the invention, centralized refers to a centralized management node (i.e., the network-side apparatus according to the embodiment of the invention) being arranged in a specific area to determine an interference level between adjacent cells. The centralized management node knows geographical locations of respective cells served by the node and adjacency relationships between the cells as well as types, transmission power and other information of respective NodeBs. The NodeBs send respective measured interference parameter values of the respective adjacent cells to the centralized management node via network interfaces, and the node has an interference strength threshold prestored therein and compares a measurement result between adjacent cells with the interference threshold to determine whether unacceptable cross interface will arise between the two adjacent cells if they are configured with different uplink and downlink configurations.

In the step 202, the network-side apparatus compares the interference parameter value with a threshold corresponding to the target cell and determines from a comparison result whether the target cell can select an uplink and downlink configuration autonomously.

Particularly the interference parameter value includes but is not limited to one or more of the following parameter values:

A Reference Signal Received Power (RSRP) value, a Received Interference Power (RIP) value, a Channel Quality Indicator (CQI) value and a Reference Signal Received Quality (RSRQ) value.

They will be described below respectively.

In a first scenario, the interference parameter value includes an RSRP value, and the RSRP value here is a first RSRP value of a reference signal of an adjacent cell received by the target cell.

Particularly the network-side apparatus can compare the first RSRP value with a first threshold corresponding to the target cell and determine whether the first RSRP value is below the corresponding first threshold, and if so, then the apparatus determines that the target cell can select an uplink and downlink configuration autonomously; otherwise, the apparatus determines that the target cell can not select an uplink and downlink configuration autonomously.

Figure 1:
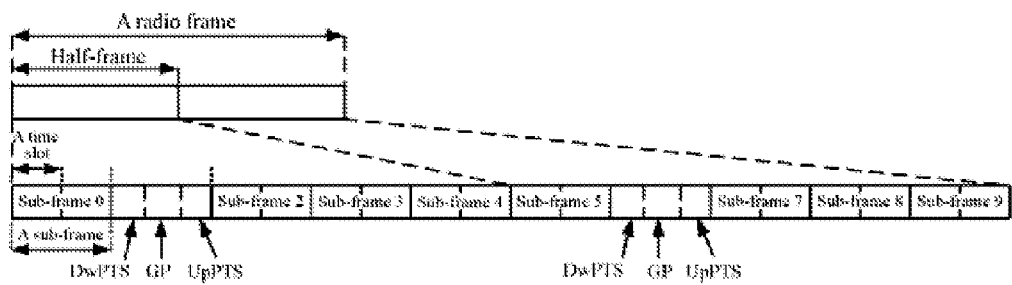
FIG. 1 is a schematic diagram of a frame structure of a TD-LTE system.
Figure 2:
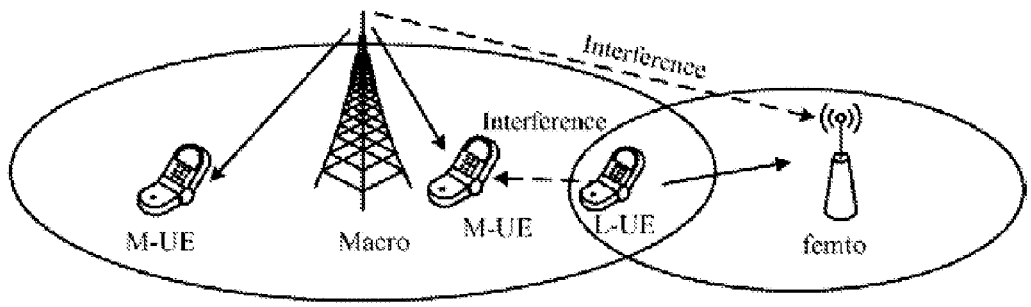
FIG. 2 is a schematic diagram of interference across time slots.

As illustrated in FIG. 2, for example, the network-side apparatus knows that there is an adjacency relationship between the macro cell and a femto cell and the macro cell reports the measured RSRP strength of a received reference signal of the femto cell as X dBm. The network-side apparatus presets an allowable interference level value of the macro cell as M dBm (this threshold is derived from simulation and evaluation or network measurement), and if X<M, then the apparatus determines that the macro cell can select an uplink and downlink configuration autonomously.

The first threshold corresponding to the cell can be prescribed in a protocol. The first threshold can also be updated as needed.

In the step 201, the first RSRP value determined by the network-side apparatus is measured and reported by a NodeB serving the target cell.

In an implementation, the NodeB measures the received reference signal of the adjacent cell in a measurement gap or in an uplink sub-frame and obtains the first RSRP value.

Specifically if the NodeB measures the received reference signal of the adjacent cell in a measurement gap and obtains the first RSRP value, then the NodeB may be configured with a NodeB measurement gap (an eNB measurement gap) defined as a period of time for NodeB measurement, e.g., 1 ms or 5 ms. In the measurement gap of time, the NodeB measures the strength at which a NodeB of the adjacent cell transmits a signal, for example, an RSRP value. If the NodeB does not identify the adjacent cell prior to measurement, then the NodeB needs to perform a task of searching for and synchronizing with the adjacent cell in the measurement gap and thus needs to be configured with a longer measurement gap, e.g., 5 ms or more; and if the NodeB has found the adjacent cell prior to measurement, then it can be configured with a shorter measurement gap, e.g., below 5 ms. In the measurement gap, the NodeB will not perform any transmission or reception of a signal in the current cell.

If a first RSRP value of a specific adjacent cell as received by the target cell is measured above a preset threshold, then it is identified that a transmitted signal of the adjacent cell will cause cross-interference with uplink reception of the current cell if the adjacent cell has a different uplink and downlink allocation proportion from the current cell.

If the NodeB measures the received reference signal of the adjacent cell in an uplink sub-frame and obtains the first RSRP value, then the NodeB measures a transmitted signal of a NodeB of the adjacent cell in the uplink sub-frame, for example, an RSRP value. This scheme requires no dedicated measurement gap to be configured, and the NodeB can simply terminate uplink scheduling of a user in the current cell for the uplink sub-frame in which measurement is to be performed. Since there are few consecutive uplink sub-frames available, if a first RSRP value of a specific adjacent cell as received by the target cell is measured above a preset threshold, then it is identified that a transmitted signal of the adjacent cell will cause cross-interference with uplink reception of the current cell if the adjacent cell has a different uplink and downlink allocation proportion from the current cell.

Preferably before the step 202, the method further includes:

The network-side apparatus determines a second RSRP value of a reference signal of the target cell received by the adjacent cell of the target cell; and correspondingly in the step 202, the network-side apparatus determines from the first RSRP value and the second RSRP value whether the target cell can select an uplink and downlink configuration autonomously.

Specifically the network-side apparatus compares the first RSRP value with the first threshold corresponding to the target cell and the second RSRP value with a first threshold corresponding to the adjacent cell and determines whether both the RSRP values of the two cells are below the corresponding first thresholds, and if so, then the apparatus determines that the target cell can select an uplink and downlink configuration autonomously; otherwise, the apparatus determines that the target cell can not select an uplink and downlink configuration autonomously. If so, then the apparatus can further determine that the adjacent cell can select an uplink and downlink configuration autonomously; otherwise, the apparatus can further determine that the adjacent cell can not select an uplink and downlink configuration autonomously.

As illustrated in FIG. 2, for example, the respective NodeBs report measured RSRP information of the adjacent NodeBs, and the network-side apparatus knows that there is an adjacency relationship between the macro cell and a femto cell and that transmission power of the macro cell is 46 dBm and transmission power of the femto cell is 20 dBm, and the macro cell reports a measured RSRP strength of the femto cell as X dBm and the femto cell reports a measured RSRP strength of the macro cell as Y dBm. The network-side apparatus presets an allowable interference level value of the macro cell as M dBm and an allowable interference level value of the femto cell as N dBm. The network-side apparatus makes centralized determination that different uplink and downlink configurations can be configured between the two cells when X<M and Y<N upon reception of the measured information.

Here the first thresholds corresponding to the cells can be prescribed in a protocol. The first thresholds can also be updated as needed.

Particularly the network-side apparatus determines the second RSRP value in two approaches:

In a first approach, the NodeB serving the adjacent cell reports the second RSRP value; and correspondingly the network-side apparatus receives the second RSRP value measured and reported by the NodeB serving the adjacent cell.

The NodeB serving the adjacent cell determines the second RSRP value in the same way as the NodeB serving the target cell determines the first RSRP value, and a repeated description thereof will be omitted here.

In a second approach, the network-side apparatus receives a path loss value between the target cell and the adjacent cell reported by a NodeB and determines the second RSRP value from a transmission power value of the target cell and the path loss value between the target cell and the adjacent cell.

Specifically the NodeB serving the target cell reports the path loss value between the target cell and the adjacent cell; and the network-side apparatus makes the difference between the transmission power value of the target cell and the path loss value between the target cell and the adjacent cell and obtains the difference as the second RSRP value upon reception of the path loss value.

In an implementation, the NodeB obtains uplink and downlink sub-frame allocation information of the adjacent cell and Cell-specific Reference Signal (CRS) transmission power information of the adjacent cell via a network interface, for example, the macro cell or a pico cell can obtain the foregoing information via an X2 interface; and a femto cell can obtain the foregoing information via an S1 interface. Then the NodeB subtracts the first RSRP from the CRS transmission power information of the corresponding adjacent cell to obtain the path loss value between the current cell and the adjacent cell.

Whether the first approach or the second approach is particularly adopted can be set in a protocol or higher-layer signaled.

In a second scenario, the interference parameter value includes an RIP value.

Particularly the network-side apparatus can compare the RIP value with a second threshold corresponding to the target cell and determine whether the RIP is below the corresponding second threshold, and if so, then the apparatus determines that the target cell can select an uplink and downlink configuration autonomously; otherwise, the apparatus determines that the target cell can not select an uplink and downlink configuration autonomously.

Here the second threshold corresponding to the cell can be prescribed in a protocol. The second threshold can also be updated as needed.

In the step 201, the RIP value determined by the network-side apparatus is measured and reported by a NodeB serving the target cell.

In an implementation, the NodeB measures all the received interference other than a useful signal in the current cell in an uplink sub-frame and obtains the RIP value.

Specifically the NodeB measures the received RIP value in the uplink sub-frame, and the RIP value includes all the interference values including thermal noise, etc., other than a useful signal in the current cell.

In a third scenario, the interference parameter value includes a CQI value and/or an RSRQ value, and here the CQI value and/or the RSRQ value includes only a CQI value, only an RSRQ value and both a CQI value and an RSRQ value.

Particularly if the interference parameter value includes only a CQI value, then the network-side apparatus can compare the CQI value with a third threshold corresponding to the target cell, determine whether the CQI value is below the corresponding third threshold, and if so, then the apparatus determines that the target cell can select an uplink and downlink configuration autonomously; otherwise, the apparatus determines that the target cell can not select an uplink and downlink configuration autonomously.

If the interference parameter value includes only an RSRQ value, then the network-side apparatus can compare the RSRQ value with a fourth threshold corresponding to the target cell, determine whether the RSRQ value is below the corresponding fourth threshold, and if so, then the apparatus determines that the target cell can select an uplink and downlink configuration autonomously; otherwise, the apparatus determines that the target cell can not select an uplink and downlink configuration autonomously.

If the interference parameter value includes a CQI value and an RSRQ value, then the network-side apparatus can compare the CQI value with a third threshold corresponding to the target cell and the RSRQ value with a fourth threshold corresponding to the target cell, determine whether the CQI value is below the corresponding third threshold and the RSRQ value is below the corresponding fourth threshold, and if so, then the apparatus determines that the target cell can select an uplink and downlink configuration autonomously; otherwise, the apparatus determines that the target cell can not select an uplink and downlink configuration autonomously.

Here the third threshold and the fourth threshold corresponding to the cell can be prescribed in a protocol. The third threshold and the fourth threshold can also be updated as needed.

In the step 201, the CQI value and/or the RSRP value determined by the network-side apparatus is reported by a NodeB serving the target cell.

In an implementation, the NodeB receives the CQI value and/or the RSRP value reported from a UE and reports the received CQI value and/or RSRP value to the network-side apparatus.

Specifically, in order to identify the extent of interference of one UE to another UE, the cell NodeB collects periodical or non-periodical wideband CQI feedback information reported by a UE in the current cell and/or collects RSRQ information reported by the UE in the current cell, etc., for example, the NodeB can trigger the UE to report or can set a period at which the UE reports periodically. If the UE reports a wideband CQI value below a preset threshold or reports an RSRP value below a preset threshold, then the UE in the current cell may receive cross interference of a UE in the adjacent cell. In order to make a determination result more accurate, a measurement result can be processed, for example, the NodeB can make a statistic of measurement results over a period of time through temporal smoothing and determine whether the statistic is below a target value, or for example, make a statistic of measurement results of a plurality of users and then make determination.

A part or all of the first scenario to the third scenario can be involved as needed. Regardless of whether a part or all of them are involved, it is determined that the target cell can select an uplink and downlink configuration autonomously as long as each interference parameter value satisfies such a condition that the target cell can select an uplink and downlink configuration autonomously.

After the step 202, the method further includes:

The network-side apparatus instructs the target cell to select an uplink and downlink configuration autonomously, and can further notify each cell adjacent to the target cell, after determining that the target cell can select an uplink and downlink configuration autonomously; and The network-side apparatus notifies the target cell of uniform uplink and downlink configuration information, and can further notify each cell adjacent to the target cell, after determining that the target cell can not select an uplink and downlink configuration autonomously.

The NodeB sets an uplink and downlink configuration as instructed by the network-side apparatus and sets up the current cell to start provision of a communication service to the UE.

Particularly the network-side apparatus according to the embodiment of the invention can be a higher-layer apparatus, e.g., a Radio Link Control (RNC) apparatus; or can be another network-side apparatus or a virtual apparatus or a logic node; or can be a new network-side apparatus. The NodeB according to the embodiment of the invention can be a macro NodeB, a pico NodeB, a home NodeB, etc.

Based upon the same inventive idea, there are further provided in embodiments of the invention a system for centralized determination of an uplink and downlink configuration, a network-side apparatus for centralized determination of an uplink and downlink configuration and a NodeB for centralized determination of an uplink and downlink configuration, and since these apparatuses address the problem under a similar principle to the method of centralized determination of an uplink and downlink configuration, reference can be made to the implementation of the method for implementations for these apparatuses, and a repeated description thereof will be omitted here.

Figure 4:
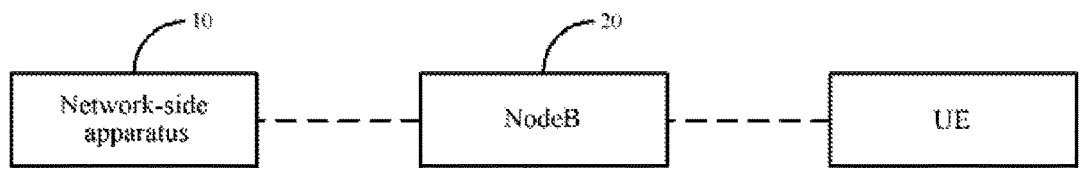
FIG. 4 is a schematic diagram of a system for centralized determination of an uplink and downlink configuration according to an embodiment of the invention.

As illustrated in FIG. 4, a system for centralized determination of an uplink and downlink configuration according to an embodiment of the invention includes a network-side apparatus 10 and NodeBs 20.

The network-side apparatus 10 is configured to determine an interference parameter value of a target cell and to determine from the interference parameter value of the target cell whether the target cell can select an uplink and downlink configuration autonomously.

A NodeB 20 serving the target cell is configured to report the interference parameter value of the target cell.

The network-side apparatus 10 compares the interference parameter value with a threshold corresponding to the target cell and determines from a comparison result whether the target cell can select an uplink and downlink configuration autonomously.

Particularly the interference parameter value includes but is not limited to one or more of the following parameter values:

An RSRP value, an RIP value, a CQI value and an RSRQ value.

They will be described below respectively.

In a first scenario, the interference parameter value includes an RSRP value, and the RSRP value here is a first RSRP value of a reference signal of an adjacent cell received by the target cell.

Particularly the network-side apparatus 10 can compare the first RSRP value with a first threshold corresponding to the target cell and determine whether the first RSRP value is below the corresponding first threshold, and if so, then the apparatus determines that the target cell can select an uplink and downlink configuration autonomously; otherwise, the apparatus determines that the target cell can not select an uplink and downlink configuration autonomously.

The first RSRP value determined by the network-side apparatus is measured and reported by the NodeB 20 serving the target cell.

In an implementation, the NodeB 20 measures the received reference signal of the adjacent cell in a measurement gap or in an uplink sub-frame and obtains the first RSRP value.

Preferably the network-side apparatus 10 determines a second RSRP value of a reference signal of the target cell received by the adjacent cell of the target cell and determines from the first RSRP value and the second RSRP value whether the target cell can select an uplink and downlink configuration autonomously.

Specifically the network-side apparatus 10 compares the first RSRP value with the first threshold corresponding to the target cell and the second RSRP value with a first threshold corresponding to the adjacent cell and determines whether both the RSRP values of the two cells are below the corresponding first thresholds, and if so, then the apparatus determines that the target cell can select an uplink and downlink configuration autonomously; otherwise, the apparatus determines that the target cell can not select an uplink and downlink configuration autonomously. If so, then the apparatus can further determine that the adjacent cell can select an uplink and downlink configuration autonomously; otherwise, the apparatus can further determine that the adjacent cell can not select an uplink and downlink configuration autonomously.

Particularly the network-side apparatus 10 determines the second RSRP value in two approaches:

In a first approach, a NodeB 20 serving the adjacent cell reports the second RSRP value; and correspondingly the network-side apparatus 10 receives the second RSRP value measured and reported by the NodeB 20 serving the adjacent cell.

In a second approach, the network-side apparatus 10 receives a path loss value between the target cell and the adjacent cell reported by a NodeB 20 and determines the second RSRP value from a transmission power value of the target cell and the path loss value between the target cell and the adjacent cell.

Specifically the NodeB 20 serving the target cell reports the path loss value between the target cell and the adjacent cell; and the network-side apparatus 10 makes the difference between the transmission power value of the target cell and the path loss value between the target cell and the adjacent cell and obtains the difference as the second RSRP value upon reception of the path loss value.

Whether the first approach or the second approach is particularly adopted can be set in a protocol or higher-layer signaled.

In a second scenario, the interference parameter value includes an RIP value.

Particularly the network-side apparatus 10 can compare the RIP value with a second threshold corresponding to the target cell and determine whether the RIP is below the corresponding second threshold, and if so, then the apparatus determines that the target cell can select an uplink and downlink configuration autonomously; otherwise, the apparatus determines that the target cell can not select an uplink and downlink configuration autonomously.

The RIP value determined by the network-side apparatus 10 is measured and reported by the NodeB 20 serving the target cell.

In an implementation, the NodeB 20 measures all the received interference other than a useful signal in the current cell in an uplink sub-frame and obtains the RIP value.

In a third scenario, the interference parameter value includes a CQI value and/or an RSRQ value, and here the CQI value and/or the RSRQ value includes only a CQI value, only an RSRQ value and both a CQI value and an RSRQ value. Correspondingly the system according to the embodiment of the invention can further include a UE.

The CQI value and/or the RSRP value determined by the network-side apparatus 10 is reported by the NodeB 20 serving the target cell.

In an implementation, the NodeB 20 receives the CQI value and/or the RSRP value reported from the UE and reports the received CQI value and/or RSRP value to the network-side apparatus.

A part or all of the first scenario to the third scenario can be involved as needed. Regardless of whether a part or all of them are involved, it is determined that the target cell can select an uplink and downlink configuration autonomously as long as each interference parameter value satisfies such a condition that the target cell can select an uplink and downlink configuration autonomously.

The network-side apparatus 10 instructs the target cell to select an uplink and downlink configuration autonomously, and can further notify each cell adjacent to the target cell, after determining that the target cell can select an uplink and downlink configuration autonomously; and The network-side apparatus 10 notifies the target cell of uniform uplink and downlink configuration information, and can further notify each cell adjacent to the target cell, after determining that the target cell can not select an uplink and downlink configuration autonomously.

The NodeB 20 sets an uplink and downlink configuration as instructed by the network-side apparatus 10 and sets up the current cell to start provision of a communication service to the UE.

Figure 5:
FIG. 5 is schematic structural diagram of a network-side apparatus for centralized determination of an uplink and downlink configuration according to an embodiment of the invention.

As illustrated in FIG. 5, a network-side apparatus for centralized determination of an uplink and downlink configuration according to an embodiment of the invention includes a first parameter value determination module 100 and a first configuration determination module 110.

The first parameter value determination module 100 is configured to determine an interference parameter value of a target cell.

The first configuration determination module 110 is configured to determine from the interference parameter value of the target cell whether the target cell can select an uplink and downlink configuration autonomously.

Particularly the first configuration determination module 110 compares the interference parameter value with a threshold corresponding to the target cell and determines from a comparison result whether the target cell can select an uplink and downlink configuration autonomously.

The interference parameter value includes but is not limited to one or more of an RSRP value, an RIP value, a CQI value and an RSRQ value.

Preferably if the interference parameter value includes a first RSRP value of a reference signal of an adjacent cell received by the target cell, then the first parameter value determination module 100 determines a second RSRP value of a reference signal of the target cell received by the adjacent cell of the target cell; and correspondingly the first configuration determination module 110 determines from the first RSRP value and the second RSRP value whether the target cell can select an uplink and downlink configuration autonomously.

The first parameter value determination module 100 receives the first RSRP value measured and reported by a NodeB.

The first parameter value determination module 100 is further configured to receive a path loss value between the target cell and the adjacent cell reported by a NodeB and to determine the second RSRP value from a transmission power value of the target cell and the path loss value between the target cell and the adjacent cell.

The first configuration determination module 110 is configured to compare the first RSRP value with a first threshold corresponding to the target cell and the second RSRP value with a first threshold corresponding to the adjacent cell and to determine from a comparison result whether the target cell can select an uplink and downlink configuration autonomously.

If the interference parameter value includes an RIP value, then the first parameter value determination module 100 receives the RIP value measured and reported by a NodeB.

If the interference parameter value includes a CQI value and/or an RSRQ value, then the first parameter value determination module 100 receives the CQI value and/or the RSRQ value reported by a NodeB.

Particularly the first configuration determination module 110 instructs the target cell to select an uplink and downlink configuration autonomously after determining that the target cell can select an uplink and downlink configuration autonomously; and notifies the target cell of uniform uplink and downlink configuration information after determining that the target cell can not select an uplink and downlink configuration autonomously.

Figure 6:
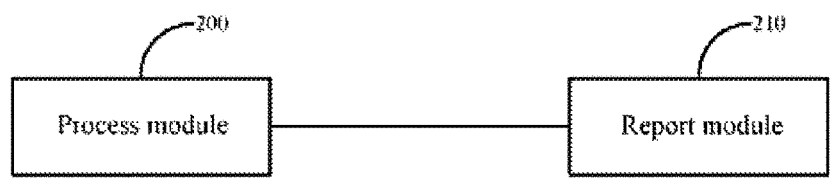
FIG. 6 is schematic structural diagram of a NodeB for centralized determination of an uplink and downlink configuration according to an embodiment of the invention.

As illustrated in FIG. 6, a NodeB for centralized determination of an uplink and downlink configuration according to an embodiment of the invention includes a process module 200 and a report module 210.

The process module 200 is configured to determine an interference parameter value.

The report module 210 is configured to report the interference parameter value determined by the process module 200.

If the interference parameter value includes a first RSRP value of a reference signal of an adjacent cell received by a current cell, Then the process module 200 measures the received reference signal of the adjacent cell in a measurement gap and obtains the first RSRP value; or measures the received reference signal of the adjacent cell in an uplink sub-frame and obtains the first RSRP value.

The process module 200 can further determine a path loss value between the current cell and the adjacent cell from a transmission power value of the adjacent cell and the first RSRP value; and correspondingly the report module 210 reports the path loss value.

If the interference parameter value includes an RIP value, then the process module 200 measures all the received interference other than a useful signal in the current cell in an uplink sub-frame and obtains the RIP value.

If the interference parameter value includes a CQI value and/or an RSRQ value, then the process module 200 receives the CQI value and/or the RSRQ value reported from a UE.

Figure 7:
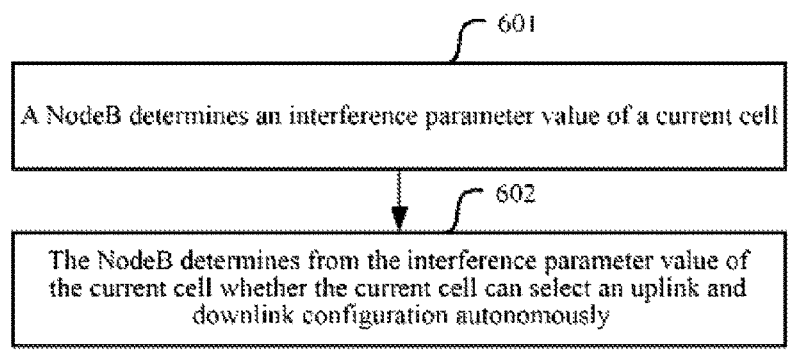
FIG. 7 is a schematic flow chart of a method of distributed determination of an uplink and downlink configuration according to an embodiment of the invention.

As illustrated in FIG. 7, a method of distributed determination of an uplink and downlink configuration according to an embodiment of the invention includes the following steps:

Step 601. A NodeB determines an interference parameter value of a current cell.

Step 602. The NodeB determines from the interference parameter value of the current cell whether the current cell can select an uplink and downlink configuration autonomously.

In the embodiment of the invention, distributed refers to allowable interference level values of current cells (and possibly also adjacent cells) being preset in respective NodeBs and then making determination separately by the respective NodeBs.

In the step 602, the NodeB compares the interference parameter value with a threshold corresponding to the current cell and determines from a comparison result whether the current cell can select an uplink and downlink configuration autonomously.

Particularly the interference parameter value includes but is not limited to one or more of the following parameter values:

An RSRP value, an RIP value, a CQI value and a RSRQ value.

They will be described below respectively.

In a first scenario, the interference parameter value includes an RSRP value, and the RSRP value here is a first RSRP value of a reference signal of an adjacent cell received by the current cell.

Particularly the NodeB can compare the first RSRP value with a first threshold corresponding to the current cell and determine whether the first RSRP value is below the corresponding first threshold, and if so, then the NodeB determines that the current cell can select an uplink and downlink configuration autonomously; otherwise, the NodeB determines that the current cell can not select an uplink and downlink configuration autonomously.

As illustrated in FIG. 2, for example, the macro NodeB measures an RSRP strength of a reference signal of a femto cell received by the macro cell as X dBm. The macro NodeB presets an allowable interference level value of the macro cell as M dBm (this threshold is derived from simulation and evaluation or network measurement), and if X<M, then the NodeB determines that the macro cell can select an uplink and downlink configuration autonomously.

The first threshold corresponding to the cell can be prescribed in a protocol. The first threshold can also be updated as needed.

In the step 601, the NodeB measures the received reference signal of the adjacent cell in a measurement gap or in an uplink sub-frame and obtains the first RSRP value.

Specifically if the NodeB measures the received reference signal of the adjacent cell in a measurement gap and obtains the first RSRP value, then the NodeB may be configured with a NodeB measurement gap defined as a period of time for NodeB measurement, e.g., 1 ms or 5 ms. In the measurement gap of time, the NodeB measures the strength at which a NodeB of the adjacent cell transmits a signal, for example, an RSRP value. If the NodeB does not identify the adjacent cell prior to measurement, then the NodeB needs to perform a task of searching for and synchronizing with the adjacent cell in the measurement gap and thus needs to be configured with a longer measurement gap, e.g., 5 ms or more; and if the NodeB has found the adjacent cell prior to measurement, then it can be configured with a shorter measurement gap, e.g., below 5 ms. In the measurement gap, the NodeB will not perform any transmission or reception of a signal in the current cell. If a first RSRP value of a specific adjacent cell as received by the current cell is measured above a preset threshold, then it is identified that a transmitted signal of the adjacent cell will cause cross-interference with uplink reception of the current cell if the adjacent cell has a different uplink and downlink allocation proportion from the current cell.

If the NodeB measures the received reference signal of the adjacent cell in an uplink sub-frame and obtains the first RSRP value, then the NodeB measures a transmitted signal of a NodeB of the adjacent cell in the uplink sub-frame, for example, an RSRP value. This scheme requires no dedicated measurement gap to be configured, and the NodeB can simply terminate uplink scheduling of a user in the current cell for the uplink sub-frame in which measurement is to be performed. Since there are few consecutive uplink sub-frames available, if a first RSRP value of a specific adjacent cell as received by the current cell is measured above a preset threshold, then it is identified that a transmitted signal of the adjacent cell will cause cross-interference with uplink reception of the current cell if the adjacent cell has a different uplink and downlink allocation proportion from the current cell.

Preferably before the step 602, the method further includes:

The NodeB determines a second RSRP value of a reference signal of the current cell received by the adjacent cell of the current cell; and correspondingly in the step 602, the NodeB determines from the first RSRP value and the second RSRP value whether the current cell can select an uplink and downlink configuration autonomously.

Specifically the NodeB compares the first RSRP value with the first threshold corresponding to the current cell and the second RSRP value with a first threshold corresponding to the adjacent cell and determines whether both the RSRP values of the two cells are below the corresponding thresholds, and if so, then the NodeB determines that the current cell can select an uplink and downlink configuration autonomously; otherwise, the NodeB determines that the current cell can not select an uplink and downlink configuration autonomously.

Here the first thresholds corresponding to the cells can be prescribed in a protocol. The first thresholds can also be updated as needed.

As illustrated in FIG. 2, the macro NodeB measures an RSRP strength of a femto cell received by the macro cell as X dBm and an RSRP strength of the macro cell received by the femto cell determined by the macro NodeB as Y dBm. The macro NodeB presets an allowable interference level value of the macro cell as M dBm and an allowable interference level value of the femto cell as N dBm. The NodeB makes centralized determination that an uplink and downlink configuration can be selected autonomously when X<M and Y<N.

Particularly the NodeB determines the second RSRP value in two approaches:

In a first approach, the NodeB obtains the second RSRP value via an X2 interface or an S1 interface.

For example, the NodeB can obtain the second RSRP value from a NodeB serving the adjacent cell via an X2 interface or an S1 interface; or can obtain the second RSRP value from a centralized network-side apparatus according to an embodiment of the invention via an X2 interface or an S1 interface.

In a second approach, the NodeB determines a path loss value between the current cell and the adjacent cell from a transmission power value of the adjacent cell and the first RSRP value and determines the second RSRP value from a transmission power value of the current cell and the determined path loss value between the current cell and the adjacent cell.

In an implementation, the NodeB obtains uplink and downlink sub-frame allocation information of the adjacent cell and CRS transmission power information of the adjacent cell via a network interface, for example, the macro cell or a pico cell can obtain the foregoing information via an X2 interface; and a femto cell can obtain the foregoing information via an S1 interface. Then the NodeB subtracts the first RSRP from the CRS transmission power information of the corresponding adjacent cell to obtain the path loss value between the current cell and the adjacent cell.

Whether the first approach or the second approach is particularly adopted can be set in a protocol or higher-layer signaled.

In a second scenario, the interference parameter value includes an RIP value.

Particularly the NodeB can compare the RIP value with a second threshold corresponding to the current cell and determine whether the RIP is below the corresponding second threshold, and if so, then the NodeB determines that the current cell can select an uplink and downlink configuration autonomously; otherwise, the apparatus determines that the current cell can not select an uplink and downlink configuration autonomously.

Here the second threshold corresponding to the cell can be prescribed in a protocol. The second threshold can also be updated as needed.

In the step 601, the NodeB measures all the received interference other than a useful signal in the current cell in an uplink sub-frame and obtains the RIP value.

Specifically the NodeB measures the received RIP value in the uplink sub-frame, and the RIP value includes all the interference values including thermal noise, etc., other than a useful signal in the current cell.

In a third scenario, the interference parameter value includes a CQI value and/or an RSRQ value, and here the CQI value and/or the RSRQ value includes only a CQI value, only an RSRQ value and both a CQI value and an RSRQ value.

Particularly if the interference parameter value includes only a CQI value, then the NodeB can compare the CQI value with a third threshold corresponding to the current cell and determine whether the CQI value is below the corresponding third threshold, and if so, then the NodeB determines that the current cell can select an uplink and downlink configuration autonomously; otherwise, the NodeB determines that the current cell can not select an uplink and downlink configuration autonomously.

If the interference parameter value includes only an RSRQ value, then the NodeB can compare the RSRQ value with a fourth threshold corresponding to the current cell and determine whether the RSRQ value is below the corresponding fourth threshold, and if so, then the NodeB determines that the current cell can select an uplink and downlink configuration autonomously; otherwise, the NodeB determines that the current cell can not select an uplink and downlink configuration autonomously.

If the interference parameter value includes a CQI value and an RSRQ value, then the NodeB can compare the CQI value with a third threshold corresponding to the current cell and the RSRQ value with a fourth threshold corresponding to the current cell and determine whether the CQI value is below the corresponding third threshold and the RSRQ value is below the corresponding fourth threshold, and if so, then the NodeB determines that the current cell can select an uplink and downlink configuration autonomously; otherwise, the NodeB determines that the current cell can not select an uplink and downlink configuration autonomously.

Here the third threshold and the fourth threshold corresponding to the cell can be prescribed in a protocol. The third threshold and the fourth threshold can also be updated as needed.

In the step 601, the NodeB receives the CQI value and/or the RSRP value reported from a UE and reports the received CQI value and/or RSRP value to a network-side apparatus.

Specifically, in order to identify the extent of interference of one UE to another UE, the cell NodeB collects periodical or non-periodical wideband CQI feedback information reported by a UE in the current cell and/or collects RSRQ information reported by the UE in the current cell, etc., for example, the NodeB can trigger the UE to report or can set a period at which the UE reports periodically. If the UE reports a wideband CQI value below a preset threshold or reports an RSRP value below a preset threshold, then the UE in the current cell may receive cross interference of a UE in the adjacent cell. In order to make a determination result more accurate, a measurement result can be processed, for example, the NodeB can make a statistic of measurement results over a period of time through temporal smoothing and determine whether the statistic is below a target value, or for example, make a statistic of measurement results of a plurality of users and then make determination.

A part or all of the first scenario to the third scenario can be involved as needed. Regardless of whether a part or all of them are involved, it is determined that the current cell can select an uplink and downlink configuration autonomously as long as each interference parameter value satisfies such a condition that the current cell can select an uplink and downlink configuration autonomously.

After the step 602, the method further includes:

The NodeB selects an uplink and downlink configuration autonomously after determining that the current cell can select an uplink and downlink configuration autonomously; and The NodeB selects an uplink and downlink configuration according to configuration information after determining that the current cell can not select an uplink and downlink configuration autonomously.

The NodeB selects an uplink and downlink configuration according to configuration information in one of the following approaches but will not be limited thereto:

The NodeB selects an uplink and downlink configuration according to default configuration information; the NodeB selects an uplink and downlink configuration according to uniform configuration information transmitted from the network side; or the NodeB selects an uplink and downlink configuration according to configuration information of the interfering adjacent cell.

The NodeB sets an uplink and downlink configuration according to a determination result and sets up the current cell to start provision of a communication service to the UE.

After the step 602, the method can further include:

The cell NodeB making the determination sends a measurement result to the NodeB of the adjacent cell, including the contents including one or more but not limited to the following contents: the ID of the current cell, the ID of the destination cell (i.e., the cell receiving the information), results of various measurement parameters, preset determination thresholds for the various measurement parameters, etc. The information can be transmitted via an X2 interface or an S1 interface between the NodeBs.

Alternatively the cell NodeB making the determination sends a determination result of a measurement parameter to the NodeB of the adjacent cell, including the contents including one or more but not limited to the following contents: the ID of the current cell, the ID of the destination cell (i.e., the cell receiving the information), determination results of various measurement parameters, etc. For example, whether cross interference of the adjacent cell arises or may arise is determined from a specific measurement parameter, and then one of two states including "Interference Arises" and "No Interference" is sent to the NodeB of the adjacent cell. For example, a specific measurement parameter is quantized to a specific level, e.g., "High Interference", "Medium Interference", "Low Interference", etc., and then the quantized information is sent to the NodeB of the adjacent cell.

Particularly the NodeB according to the embodiment of the invention can be a macro NodeB, a pico NodeB, a home NodeB, etc.

Based upon the same inventive idea, there are further provided in embodiments of the invention a system for distributed determination of an uplink and downlink configuration and a NodeB for distributed determination of an uplink and downlink configuration, and since these apparatuses address the problem under a similar principle to the method of distributed determination of an uplink and downlink configuration, reference can be made to the implementation of the method for implementations for these apparatuses, and a repeated description thereof will be omitted here.

Figure 8:
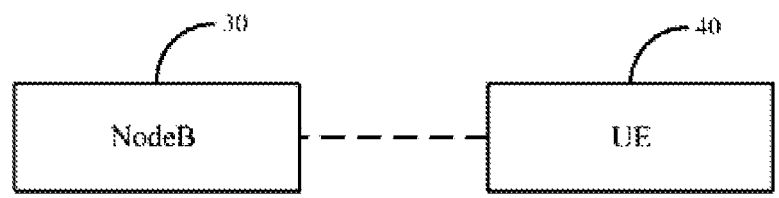
FIG. 8 is a schematic diagram of a system for distributed determination of an uplink and downlink configuration according to an embodiment of the invention.

As illustrated in FIG. 8, a system for distributed determination of an uplink and downlink configuration according to an embodiment of the invention includes a NodeB 30 and a UE 40.

The NodeB 30 is configured to determine an interference parameter value of a current cell and to determine from the interference parameter value of the current cell whether the current cell can select an uplink and downlink configuration autonomously.

Particularly if the interference parameter value is a CQI value and/an RSRQ value, then the UE 40 is configured to measure and report the CQI value and/the RSRQ value.

Particularly the UE 40 can be trigged by the NodeB 30 to measure and report the CQI value and/the RSRQ value; or can measure and report the CQI value and/the RSRQ value periodically at a preset period.

Figure 9:
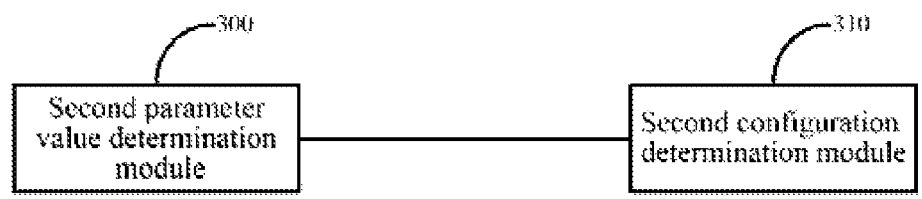
FIG. 9 is schematic structural diagram of a NodeB for distributed determination of an uplink and downlink configuration according to an embodiment of the invention.

As illustrated in FIG. 9, a NodeB for distributed determination of an uplink and downlink configuration according to an embodiment of the invention includes a second parameter value determination module 300 and a second configuration determination module 310.

The second parameter value determination module 300 is configured to determine an interference parameter value of a current cell.

The second configuration determination module 310 is configured to determine from the interference parameter value of the current cell whether the current cell can select an uplink and downlink configuration autonomously.

In an implementation, the second configuration determination module 310 compares the interference parameter value with a threshold corresponding to the current cell and determines from a comparison result whether the current cell can select an uplink and downlink configuration autonomously.

Particularly the interference parameter value includes but is not limited to one or more of the following parameter values:

An RSRP value, an RIP value, a CQI value and a RSRQ value.

They will be described below respectively.

In a first scenario, the interference parameter value includes an RSRP value, and the RSRP value here is a first RSRP value of a reference signal of an adjacent cell received by the current cell.

The second configuration determination module 310 can compare the first RSRP value with a first threshold corresponding to the current cell and determine whether the first RSRP value is below the corresponding first threshold, and if so, then the module determines that the current cell can select an uplink and downlink configuration autonomously; otherwise, the module determines that the current cell can not select an uplink and downlink configuration autonomously.

The first threshold corresponding to the cell can be prescribed in a protocol. The first threshold can also be updated as needed.

The second parameter value determination module 300 can measure the received reference signal of the adjacent cell in a measurement gap or in an uplink sub-frame and obtain the first RSRP value.

Preferably, the method second parameter value determination module 300 determines a second RSRP value of a reference signal of the current cell received by the adjacent cell; and correspondingly the second configuration determination module 310 determines from the first RSRP value and the second RSRP value whether the current cell can select an uplink and downlink configuration autonomously.

Specifically the second configuration determination module 310 compares the first RSRP value with the first threshold corresponding to the current cell and the second RSRP value with a first threshold corresponding to the adjacent cell and determines whether both the RSRP values of the two cells are below the corresponding thresholds, and if so, then the module determines that the current cell can select an uplink and downlink configuration autonomously; otherwise, the module determines that the current cell can not select an uplink and downlink configuration autonomously.

Here the first thresholds corresponding to the cells can be prescribed in a protocol. The first thresholds can also be updated as needed.

The second parameter value determination module 300 determines the second RSRP value in two approaches:

In a first approach, the second parameter value determination module 300 obtains the second RSRP value via an X2 interface or an S1 interface.

In a second approach, the second parameter value determination module 300 determines a path loss value between the current cell and the adjacent cell from a transmission power value of the adjacent cell and the first RSRP value and determines the second RSRP value from a transmission power value of the current cell and the determined path loss value between the current cell and the adjacent cell.

In an implementation, the second parameter value determination module 300 obtains uplink and downlink sub-frame allocation information of the adjacent cell and CRS transmission power information of the adjacent cell via a network interface, for example, the macro cell or a pico cell can obtain the foregoing information via an X2 interface; and a femto cell can obtain the foregoing information via an S1 interface.

Whether the first approach or the second approach is particularly adopted can be set in a protocol or higher-layer signaled.

In a second scenario, the interference parameter value includes an RIP value.

Particularly the second configuration determination module 310 can compare the RIP value with a second threshold corresponding to the current cell and determine whether the RIP is below the corresponding second threshold, and if so, then the module determines that the current cell can select an uplink and downlink configuration autonomously; otherwise, the module determines that the current cell can not select an uplink and downlink configuration autonomously.

Here the second threshold corresponding to the cell can be prescribed in a protocol. The second threshold can also be updated as needed.

The second parameter value determination module 300 measures all the received interference other than a useful signal in the current cell in an uplink sub-frame and obtains the RIP value.

In a third scenario, the interference parameter value includes a CQI value and/or an RSRQ value, and here the CQI value and/or the RSRQ value includes only a CQI value, only an RSRQ value and both a CQI value and an RSRQ value.

Particularly if the interference parameter value includes a CQI value, then the second configuration determination module 310 can compare the CQI value with a third threshold corresponding to the current cell and determine whether the CQI value is below the corresponding third threshold, and if so, then the module determines that the current cell can select an uplink and downlink configuration autonomously; otherwise, the module determines that the current cell can not select an uplink and downlink configuration autonomously.

If the interference parameter value includes an RSRQ value, then the second configuration determination module 310 can compare the RSRQ value with a fourth threshold corresponding to the current cell and determine whether the RSRQ value is below the corresponding fourth threshold, and if so, then the module determines that the current cell can select an uplink and downlink configuration autonomously; otherwise, the module determines that the current cell can not select an uplink and downlink configuration autonomously.

If the interference parameter value includes a CQI value and an RSRQ value, then the second configuration determination module 310 can compare the CQI value with a third threshold corresponding to the current cell and the RSRQ value with a fourth threshold corresponding to the current cell, determine whether the CQI value is below the corresponding third threshold and the RSRQ value is below the corresponding fourth threshold, and if so, then the module determines that the current cell can select an uplink and downlink configuration autonomously; otherwise, the module determines that the current cell can not select an uplink and downlink configuration autonomously.

Here the third threshold and the fourth threshold corresponding to the cell can be prescribed in a protocol. The third threshold and the fourth threshold can also be updated as needed.

The second configuration determination module 310 receives the CQI value and/or the RSRP value reported from a UE and reports the received CQI value and/or RSRP value to a network-side apparatus.

A part or all of the first scenario to the third scenario can be involved as needed. Regardless of whether a part or all of them are involved, it is determined that the current cell can select an uplink and downlink configuration autonomously as long as each interference parameter value satisfies such a condition that the target current cell can select an uplink and downlink configuration autonomously.

In an implementation, the second configuration determination module 310 selects an uplink and downlink configuration autonomously after determining that the current cell can select an uplink and downlink configuration autonomously; and selects an uplink and downlink configuration according to configuration information after determining that the current cell can not select an uplink and downlink configuration autonomously.

The second configuration determination module 310 selects an uplink and downlink configuration according to configuration information in one of the following approaches but will not be limited thereto:

The module selects an uplink and downlink configuration according to default configuration information; selects an uplink and downlink configuration according to uniform configuration information transmitted from the network side; or selects an uplink and downlink configuration according to configuration information of the interfering adjacent cell.

The second configuration determination module 310 can further send a measurement result to a NodeB of the adjacent cell, including the contents including one or more but not limited to the following contents: the ID of the current cell, the ID of the destination cell (i.e., the cell receiving the information), results of various measurement parameters, preset determination thresholds for the various measurement parameters, etc. The information can be transmitted via an X2 interface or an S1 interface between the NodeBs. Alternatively the second configuration determination module 310 can further send a determination result of a measurement parameter to a NodeB of the adjacent cell, including the contents including one or more but not limited to the following contents: the ID of the current cell, the ID of the destination cell (i.e., the cell receiving the information), determination results of various measurement parameters, etc. For example, whether cross interference of the adjacent cell arises or may arise is determined from a specific measurement parameter, and then one of two states including "Interference Arises" and "No Interference" is sent to the NodeB of the adjacent cell. For example, a specific measurement parameter is quantized to a specific level, e.g., "High Interference", "Medium Interference", "Low Interference", etc., and then the quantized information is sent to the NodeB of the adjacent cell.

Both centralized and distributed can be arranged in the same network so that either centralized or distributed can be selected for use as needed; or both centralized and distributed can be used concurrently. In other words, a NodeB configured in the network can be arranged to function as a centralized NodeB or as a distributed NodeB or as both a centralized NodeB and a distributed NodeB; and no matter whatever arrangement, an entity apparatus or a virtual apparatus or a logic node functioning as a centralized network-side apparatus can be configured in the network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since it is determined from an interference parameter value of a cell whether the cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of determining an uplink and downlink subframe configuration, comprising:
   a network-side apparatus acquiring an interference parameter value of a target cell from a NodeB of the target cell;
   the network-side apparatus determining from the interference parameter value of the target cell whether the target cell can perform the uplink and downlink subframe configuration autonomously, wherein the uplink and downlink subframe configuration refers to an allocation pattern of the uplink and downlink subframes; and
   the network-side apparatus transmitting information regarding whether the target cell can perform the uplink and downlink subframe configuration autonomously to the target cell.

2. The method according to claim 1, wherein the network-side apparatus determining whether the target cell can perform the uplink and downlink subframe configuration autonomously comprises:
   the network-side apparatus comparing the interference parameter value with a threshold corresponding to the target cell and determining from a comparison result whether the target cell can perform the uplink and downlink subframe configuration autonomously.

3. The method according to claim 1, wherein the network-side apparatus determining the interference parameter value of the target cell comprises: the network-side apparatus determining a first Reference Signal Received Power, RSRP, measurement value of a reference signal of an adjacent cell received by a NodeB of the target cell; and
   wherein the network-side apparatus determining whether the target cell can perform the uplink and downlink subframe configuration autonomously comprises: the network-side apparatus determining from the first RSRP measurement value whether the target cell can perform the uplink and downlink subframe configuration autonomously; and
   wherein the network-side apparatus determining from the first RSRP measurement value whether the target cell can perform the uplink and downlink subframe configuration autonomously comprises: the network-side apparatus comparing the first RSRP measurement value with a threshold corresponding to the target cell and determining from a comparison result whether the target cell can perform the uplink and downlink subframe configuration autonomously.

4. The method according to claim 1, wherein the network-side apparatus determining the interference parameter value of the target cell comprises: the network-side apparatus determining a first Reference Signal Received Power, RSRP, measurement value of a reference signal of an adjacent cell received by a NodeB of the target cell; and
   wherein the network-side apparatus determining the interference parameter value of the target cell further comprises: the network-side apparatus determining a second RSRP measurement value of a reference signal of the target cell received by a NodeB of the adjacent cell of the target cell; and
   wherein the network-side apparatus determining whether the target cell can perform the uplink and downlink subframe configuration autonomously comprises: the network-side apparatus determining from the first RSRP measurement value and the second RSRP measurement value whether the target cell can perform the uplink and downlink subframe configuration autonomously; and
   wherein the network-side apparatus determining from the first RSRP measurement value and the second RSRP measurement value whether the target cell can perform the uplink and downlink subframe configuration autonomously comprises: the network-side apparatus comparing the first RSRP measurement value with a threshold corresponding to the target cell and the second RSRP measurement value with a threshold corresponding to the adjacent cell of the target cell and determining from a comparison result whether the target cell can perform the uplink and downlink subframe configuration autonomously.

5. The method according to claim 4, wherein before the network-side apparatus determines the second RSRP measurement value of the reference signal of the target cell received by the NodeB of the adjacent cell of the target cell, the method further comprises:
   the network-side apparatus receiving a path loss value between the target cell and the adjacent cell reported by the NodeB of the target cell; and
   wherein the network-side apparatus determining the second RSRP measurement value of the reference signal of the target cell received by the NodeB of the adjacent cell of the target cell comprises:
the network-side apparatus determining the second RSRP measurement value from a transmission power value of the target cell and the path loss value between the target cell and the adjacent cell.

6. The method according to claim 4, wherein each of the first RSRP measurement value and the second RSRP measurement value is:
an actual measured RSRP measurement value; or
RSRP strength indication information obtained by quantizing an actual measured RSRP measurement value to a level.

7. The method according to claim 1, wherein the network-side apparatus transmitting information regarding whether the target cell can perform the uplink and downlink subframe configuration autonomously to the target cell, comprises:
the network-side apparatus transmitting information regarding that the target cell can perform the uplink and downlink subframe configuration autonomously after determining that the target cell can perform an uplink and downlink subframe configuration autonomously to the target cell; or
the network-side apparatus notifying the target cell of the uplink and downlink subframe configuration after determining that the target cell can not perform the uplink and downlink subframe configuration autonomously;
and wherein after the network-side apparatus transmitting information regarding that the target cell can perform the uplink and downlink subframe configuration autonomously after determining that the target cell can select the uplink and downlink subframe configuration autonomously to the target cell, the method further comprises:
the network-side apparatus notifying an adjacent cell of the target cell of information regarding that the target cell is allowed to perform the uplink and downlink subframe configuration autonomously.

8. The method according to claim 1, wherein the interference parameter value comprises one or more of:
a Reference Signal Received Power, RSRP, value, a Received Interference Power, RIP, value, a Channel Quality Indicator, CQI, value and a Reference Signal Received Quality, RSRQ, value.

9. A method of determining an uplink and downlink subframe configuration, comprising:
a NodeB of a cell acquiring an interference parameter value of the cell and reporting the interference parameter value to a network-side apparatus, wherein the interference parameter value is used for determining whether the cell can perform the uplink and downlink subframe configuration autonomously, wherein the uplink and downlink subframe configuration refers to an allocation pattern of the uplink and downlink subframes; and
the NodeB of the cell receiving from the network-side apparatus information regarding whether the cell is allowed to perform the uplink and downlink subframe configuration autonomously.

10. The method according to claim 9, wherein the NodeB of the cell determining the interference parameter value of the cell and reporting the interference parameter value to the network-side apparatus comprises:
the NodeB of the cell determining a first Reference Signal Received Power, RSRP, measurement value of a reference signal of an adjacent cell and reporting the first RSRP measurement value to the network-side apparatus.

11. The method according to claim 10, wherein the NodeB of the cell determining the first RSRP measurement value of the reference signal of the adjacent cell and reporting the first RSRP measurement value to the network-side apparatus further comprises:
the NodeB of the cell determining and reporting a path loss value between the cell and the adjacent cell, and or reporting a transmission power value of the NodeB of the cell.

12. The method according to claim 10, wherein the first RSRP measurement value is:
an actual measured RSRP measurement value; or
RSRP strength indication information obtained by quantizing an actual measured RSRP measurement value to a level.

13. The method according to claim 9, wherein after the NodeB of the cell receives from the network-side apparatus information regarding whether the cell is allowed to perform the uplink and downlink subframe configuration autonomously, the method further comprises:
the NodeB of the cell determining from the information whether the cell is allowed to perform the uplink and downlink subframe configuration autonomously; and
the NodeB of the cell performing the uplink and downlink subframe configuration autonomously when determining that the cell is allowed to perform the uplink and downlink subframe configuration autonomously; or
the NodeB of the cell performing the uplink and downlink subframe configuration notified from the network-side apparatus when determining that the cell is not allowed to perform the uplink and downlink subframe configuration autonomously.

14. A method of determining an uplink and downlink subframe configuration, comprising:
a NodeB of a first cell acquiring an interference parameter value of the first cell, wherein the NodeB of the first cell acquiring the interference parameter value of the first cell comprising: the NodeB of the first cell measuring signal of an adjacent cell, and acquiring the interference parameter value of the first cell according to the measured signal of the adjacent cell; or, the NodeB of the first cell receiving and acquiring the interference parameter value of the first cell from a UE;
the NodeB of the first cell determining from the acquired interference parameter value of the first cell whether the first cell can perform the uplink and downlink subframe configuration autonomously, wherein the uplink and downlink subframe configuration refers to an allocation pattern of the uplink and downlink subframes; and
the NodeB of the first cell performing the uplink and downlink subframe configuration autonomously when determining that the first cell can perform the uplink and downlink subframe configuration autonomously; or, the NodeB of the first cell performing the uplink and downlink subframe configuration according to configuration information when determining that the first cell can not perform the uplink and downlink subframe configuration autonomously.

15. The method according to claim 14, wherein the NodeB of the first cell determining from the interference parameter value of the first cell whether the first cell can perform the uplink and downlink subframe configuration autonomously comprises:

the NodeB of the first cell comparing the interference parameter value with a threshold corresponding to the first cell and determining from a comparison result whether the first cell can perform the uplink and downlink subframe configuration autonomously.

16. The method according to claim 14, wherein the NodeB of the first cell determining the interference parameter value of the first cell comprises: the NodeB of the first cell determining a first Reference Signal Received Power, RSRP, measurement value of a reference signal of an adjacent cell; and wherein the NodeB of the first cell determining whether the first cell can perform the uplink and downlink subframe configuration autonomously comprises: the NodeB of the first cell determining from the first RSRP measurement value whether the first cell can perform the uplink and downlink subframe configuration autonomously; and wherein the NodeB of the first cell determining from the first RSRP measurement value whether the first cell can perform the uplink and downlink subframe configuration autonomously comprises: the NodeB of the first cell comparing the first RSRP measurement value with a threshold corresponding to the first cell and determining from a comparison result whether the first cell can perform the uplink and downlink subframe configuration autonomously.

17. The method according to claim 14, wherein the NodeB of the first cell determining the interference parameter value of the first cell comprises: the NodeB of the first cell determining a first Reference Signal Received Power, RSRP, measurement value of a reference signal of an adjacent cell; and wherein the NodeB of the first cell determining the interference parameter value of the first cell further comprises: the NodeB of the first cell determining a second RSRP measurement value of a reference signal of the first cell received by a NodeB of the adjacent cell; and wherein the NodeB of the first cell determining whether the first cell can perform the uplink and downlink subframe configuration autonomously comprises: the NodeB of the first cell determining from the first RSRP measurement value and the second RSRP measurement value whether the first cell can perform the uplink and downlink subframe configuration autonomously; and wherein the NodeB of the first cell determining from the first RSRP measurement value and the second RSRP measurement value whether the first cell can perform the uplink and downlink subframe configuration autonomously comprises: the NodeB of the first cell comparing the first RSRP measurement value with a threshold corresponding to the first cell and the second RSRP measurement value with a threshold corresponding to the adjacent cell and determining from a comparison result whether the first cell can perform the uplink and downlink subframe configuration autonomously.

18. The method according to claim 17, wherein before the NodeB of the first cell determines the second RSRP measurement value of the reference signal of the first cell received by the NodeB of the adjacent cell, the method further comprises:

the NodeB of the first cell determining a path loss value between the first cell and the adjacent cell; and wherein the NodeB of the first cell determining the second RSRP measurement value of the reference signal of the first cell received by the NodeB of the adjacent cell comprises:

the NodeB of the first cell determining the second RSRP measurement value from a transmission power value of the first cell and the path loss value between the first cell and the adjacent cell.

19. The method according to claim 14, wherein the NodeB of the first cell performing the uplink and downlink subframe configuration according to configuration information when determining that the first cell can not perform the uplink and downlink subframe configuration autonomously comprises:

the NodeB of the first cell performing the uplink and downlink subframe configuration for the first cell according to default configuration information; or the NodeB of the first cell performing the uplink and downlink subframe configuration for the first cell according to configuration information transmitted from a network side; or the NodeB of the first cell performing the uplink and downlink subframe configuration for the first cell, according to configuration information of an interfering adjacent cell.

20. The method according to claim 14, further comprising:

the NodeB of the first cell transmitting to a NodeB of an adjacent cell one or more of the interference parameter value of the first cell, a threshold corresponding to the interference parameter value of the first cell, an ID of the first cell, and an ID of the adjacent cell;

wherein the interference parameter value of the first cell transmitted to the NodeB of the adjacent cell is:

an interference judgment result representing an interference existing or not existing in the first cell; or interference strength indication information obtained by quantizing the interference parameter value to a level.

* * * * *